(12) United States Patent
Hieda et al.

(10) Patent No.: US 7,618,675 B2
(45) Date of Patent: Nov. 17, 2009

(54) PATTERN FORMING METHOD AND METHOD OF PROCESSING A STRUCTURE BY USE OF SAME

(75) Inventors: Hiroyuki Hieda, Yokohama (JP); Naoko Kihara, Matsudo (JP); Katsuyuki Naito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 11/248,587

(22) Filed: Oct. 13, 2005

(65) Prior Publication Data

US 2006/0078681 A1 Apr. 13, 2006

(30) Foreign Application Priority Data

Oct. 13, 2004 (JP) .............................. 2004-298926

(51) Int. Cl.
*B05D 1/34* (2006.01)
(52) U.S. Cl. ...................................................... 427/127
(58) Field of Classification Search .................. 427/127
See application file for complete search history.

(56) References Cited

U.S. PATENT DOCUMENTS

| 3,673,139 | A | * | 6/1972 | Hrach | .......................... | 524/170 |
| 2002/0136927 | A1 | * | 9/2002 | Hieda et al. | .............. | 428/694 T |
| 2002/0168548 | A1 | | 11/2002 | Sakurai et al. | | |
| 2005/0069732 | A1 | | 3/2005 | Kamata et al. | | |
| 2005/0079283 | A1 | | 4/2005 | Sakurai et al. | | |
| 2005/0094549 | A1 | | 5/2005 | Hieda et al. | | |

FOREIGN PATENT DOCUMENTS

| JP | 2002-279616 | 9/2002 |
| JP | 2003-155365 | 5/2003 |

OTHER PUBLICATIONS

Yang et al., Nanoscopic Templates Using Self-Assembled Cylindrical Diblock Copolymers for Patterned Media, J. Vac. Sci. Tech. B 22(6), Nov./Dec. 2004, pp. 3331-3334.*
CRC Handbook of Chemistry and Physics, 88th Ed., Section 9, pp. 9-47-55.*
Cook et al., "Styrene-containing mesogens," Journal of Materials Chemistry, Jul. 2002.*
Wang et al. (J. Am. Chem. Soc.) 2000, 122, pp. 6855-6861.*
CRC Handbook of Chemistry and Physics, 88th Ed., Section 9, pp. 9-47-55 (2006).*

(Continued)

*Primary Examiner*—Michael Cleveland
*Assistant Examiner*—Robert Vetere
(74) *Attorney, Agent, or Firm*—Nixon & Vanderhye P.C.

(57) ABSTRACT

The present invention provides a pattern forming method using phase separation structure of self-assembling block copolymer and minimizing variations in pattern. A substrate having groove structure pre-formed thereon, is coated with a solution of the block copolymer comprising at least one block having a mesogen group. The block copolymer is caused to self-assemble in the groove to form block copolymer assemblies, which are regularly arrayed. The invention also relates to a processing method of processing a substrate by the use of the pattern obtained by the pattern forming method as a template.

14 Claims, 9 Drawing Sheets

OTHER PUBLICATIONS

Tian et al, *Synthesis, Nanostructures, and Functionality of Amphiphilic Liquid Crystalline Block Copolymers with Azobenzene Moieties*, Macromolecules, 2002, pp. 3739-3747.

Cheng et al., *Fabrication of nanostructures with long-range order using block copolymer lithography*, Applied Physics Letters, vol. 81, No. 19, Nov. 4, 2002, pp. 3657-3659.

Yang et al., *Nanoscopic templates using self-assembled cylindrical diblock copolymers for patterned media*, J. Vac. Sci. Technol. B 22(6), Nov./Dec. 2004, pp. 3331-3334.

Mansky et al., *Nanolithographic templates from diblock copolymer thin films*, Appl. Phys. Lett. 68(18), Apr. 29, 1996, pp. 2586-2588.

Park et al., *Block Copolymer Lithography: Periodic Arrays of ~ $10^{11}$ Holes in 1 Square Centimeter*, Science, vol. 276, May 30, 1997, pp. 1401-1404.

Office Action from counterpart application No. JP 2004-298926 and English-language translation thereof, dated Nov. 21, 2006.

\* cited by examiner

PATTERN FORMING METHOD AND METHOD OF PROCESSING A STRUCTURE BY USE OF SAME

CROSS-REFERENCE TO RELATED APPLICATIONS

This application is based upon and claims the benefit of priority from the prior Japanese Patent Applications No. 298926/2004, filed on Oct. 13, 2004; the entire contents of which are incorporated herein by reference.

BACKGROUND OF THE INVENTION

1. Field of the Invention

The present invention relates to a pattern forming method using self-assembly and a method of manufacturing a structure by use of the pattern forming method. The processing method of the present invention can be used to manufacture high-density recording media and highly integrated electronic components, for example, 2. Background Art Recent significant improvement in function of information appliances such as personal computers benefits greatly from the advance of fine processing technology used to manufacture semiconductor devices and the like. Up to now, for example, a miniaturization in fabrication size of semiconductor devices has been pursued by means of wavelength reduction in the source of exposure light mainly used in lithography. However, the higher the pattern density because of a further miniaturization in fabrication size, the higher the cost required for the lithography process in the manufacturing process. In next-generation semiconductor devices or high-density recording media manufactured through the use of fine processing, such as patterned media, a miniaturization in pattern size to 100 nm or less is required. For this purpose, use of an electron beam or the like as the exposure light source is expected. However, for the purpose of writing fine pattern, the amperage is typically reduced for a reduction in beam diameter of the electron beam. As a result, a writing sensitivity, namely, a writing speed decreases. The serious problem of a reduction in patterning throughput is left unsolved.

Against the background of the circumstances as described above, pattern forming methods have been proposed as a processing method capable of accomplishing a high throughput at low costs, which take advantage of phase separation structure of self-assembling block copolymer (see Appl. Phys. Lett., vol. 68, p. 2568 by P. Mansky et al., and Science, vol. 276, p. 1401 by M. Park et al., for example). In these methods, a polymer phase constituting a part of the phase separation structure of a block copolymer is removed through ozone treatment, plasma etching, electron beam irradiation or the like to create relief pattern. Then, the relief pattern is used as a mask to process the base substrate. The method using block copolymers is capable of creating ordered array patterns by means of the very simple processes of dissolving the block copolymer in a suitable solvent for coating a work piece therewith. The pattern size is defined by the molecular weight of the block copolymer. Therefore, if the phase separation structure of a block copolymer is within a stable range, it is possible to reduce the molecular weight for a decrease in pattern size, and phase separation structure of 30 nm or less is also provided.

Typically, the phase separation structure of a block copolymer is polycrystalline structure including a region where molecular arrangements are random. Therefore, it is impossible to physically access the individual structures isolated from each other to fetch a signal. In a method proposed for solving this problem, relief pattern or chemical pattern is pre-created on a substrate to which a coating of block copolymer is to be applied, so that the array directions in the phase separation structure of the block copolymers a coating of which is applied to the pattern are in order. The inventors have also proposed the recording media using arrays of block copolymers in Japanese Patent Laid-Open Publication No. 279616/2002 which are herein incorporated by reference.

However, even in the case of employing the methods as described above, typically, polymer molecules are randomly folded and the directions of the molecular chains are also random. Therefore, when the polymer molecules are arranged along a wall face of a patterned groove formed in the substrate, a period of the ordered structure is less likely to become constant. Such ordered structure which is not constant often gives rise to a serious problem when the phase separation structure patterns of block copolymers are used to manufacture electron devices or recording media. For example, in the case of an application to the aforementioned patterned media, the ordered structure which is not constant causes jitter noises of a reproduction signal or deviations from a positioning mark, leading to impossibility of writing and reading records at a high S/N ratio.

BRIEF SUMMARY OF THE INVENTION

According to an aspect of the present invention, a processing method comprises coating a substrate including groove structure pre-formed thereon with a solution of the block copolymer comprising at least one block having a mesogen group, and causing the block copolymer to self-assemble in the groove, thereby forming block copolymer assemblies in such a way as to be regularly arrayed.

According to another aspect of the present invention, a processing method comprises a first process of forming pattern by providing a block copolymer comprising at least one block having a mesogen group on a substrate including groove structure pre-formed thereon, and causing the block copolymer to self-assemble in the groove, thereby forming block copolymer assemblies in such a way as to be regularly arrayed, and a second process of using the formed pattern as a template to process a substrate as a work piece.

DETAILED DESCRIPTION OF THE INVENTION

Figure 4A:
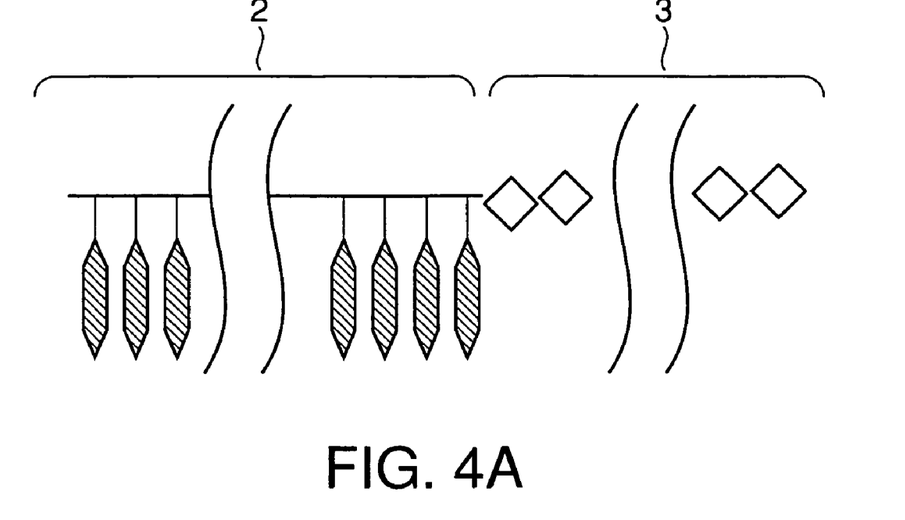
FIGS. 4A and 4B are schematic diagrams each showing a basic structure of a block copolymer which can be used in the present invention.
Figure 4B:
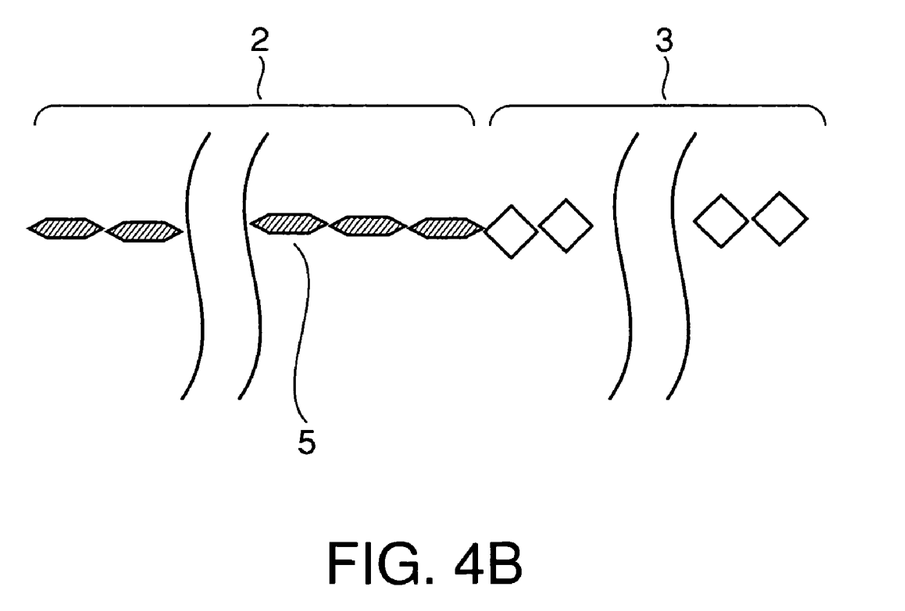

An embodiment of the present invention will be described below with reference to the accompanying drawings. A block copolymer (1) used in the present invention has basic structure comprising at least two blocks (2, 3) as illustrated in FIG. 4, and most typically, is a diblock copolymer constituted of blocks A and B. The blocks A and B have different physical properties. At least one of the blocks A and B has a mesogen group (5). For the sake of convenience, this description is given on the assumption that the block A does not have a mesogen group and the block B has a mesogen group.

A block which can be used as the block A is selected from the group consisting of polyethylene, polybutadiene, polyisoprene, polyethylene oxide, polystyrene, polyvinylpyridine, polymethyl methacrylate and the like. Any structure of the block can be selected, and therefore a plurality of types of monomers may be regularly arranged or randomly arranged. The block may have graft structure. The block may have a mesogen group to the extent that the effects of the present invention are impaired.

The block B may have either structure having a mesogen group as a side chain or structure having a mesogen group included in a main chain, or alternatively may have a mesogen group for both the main chain and the side chain. FIGS. 4A and 4B each show a schematic diagram of a side-chain copolymer comprising a block having a mesogen group as a side chain and a main-chain copolymer comprising a block having a mesogen group as a main chain. As the mesogen group, any mesogen group that is in general use can be used arbitrarily. In this connection, a mesogen group has an elongated rod-shaped or flat plate-shaped molecular chain, and has a structure including a permanent dipole providing an intermolecular force suitable for maintaining a liquid crystal state. The following schematically shows the structure of such a mesogen group.

(I)

where P is a divalent group selected from the group consisting of:

-continued and, if necessary, a side substituent Y (Y is selected from the group consisting of —F, —Cl, —Br, —CH$_3$, —(CH$_2$)$_n$—CH$_3$, —OCH$_3$, —OH, —CN, —NO$_2$, for example) may be substituted, and m is a numerical value equal to or greater than zero. When m is equal to or greater than two, each Y may be the same as or different from another. X is a binding group and selected from the group consisting of a single bond, —COO—, —OCH$_2$—, —CH=N—, —C≡C—, —O—, —CH$_2$—, —COS—, —CON—, —N=N— and the like. A plurality of core portions of the mesogen group may be coupled, and n is a numerical value equal to or greater than one. When the mesogen group is bonded to the main chain, the structure expressed by formula (I) can function as the main chain as it is. When the mesogen group is coupled as the side chain to the main chain, the aforementioned Y may be substituted for an end of the formula (I).

The blocks A and B of a block copolymer which can be used in the present invention are not limited to the examples given above.

If necessary, a block copolymer having another block in addition to the blocks A and B may be used. More specifically, a block copolymer having another block between the blocks A and B or at an outer end of the copolymer may be used. Such a block may be selected from the examples given above for the blocks A and B. However, in the block copolymer having the block in addition to the blocks A and B, the phase separation structure may possibly deteriorate. Therefore, attention should be paid when such a block is used.

The molecular weight of the block copolymer as described above is not specifically limited, but preferably the weight-average molecular weight of the block copolymer ranges from 10,000 to 200,000, more preferably from 12,000 to 50,000. A weight ratio of the block B to the total block copolymer preferably ranges from 50% to 98%, and more preferably from 70% to 96%.

The block copolymer comprising the block A and the block B as described above is dissolved in an appropriate solvent, which is then coated on groove structure pre-formed on a sample substrate by a spin coating technique. Examples of the solvent which may be used here include: lactate esters such as ethyl lactate; propylene glycol monoethyl acetate (PGMEA) and the like; ketones such as cyclopentanone, cyclohexanone, acetone, ethyl methyl ketone, methyl isobutyl ketone; cellosolves such as methyl cellosolve, methyl cellosolve acetate, ethyl cellosolve acetate, butyl cellosolve acetate; esters such as ethyl acetate, butyl acetate, isoamyl acetate, γ-butyrolactone, methyl 3-methoxypropionate, diethyl carbonate; ethers such as diethylene glycol dimethyl ether, ethylene glycol monomethyl ether; and aromatic solvents such as toluene, xylene, anisole, tetralin, tetramethylbenzene. An appropriate concentration of the solution is selected on the basis of coating conditions, but a typical concentration ranges from 1% by weight to 10% by weight. Any coating method can be used, but roller coating, dip coating, brush coating, spray coating, curtain coating and other coating methods are usually employed.

After the application of the coating of the block copolymer solution, annealing the substrate with the coating applied thereto for stimulation to assembly formation and assembly array. The annealing is performed generally in a condition from a glass transition temperature of a polymer to a melting point of the polymer. The annealing is performed, generally in a range from 60° C. to 300° C., preferably 80° C. to 240° C.

Figure 3A:
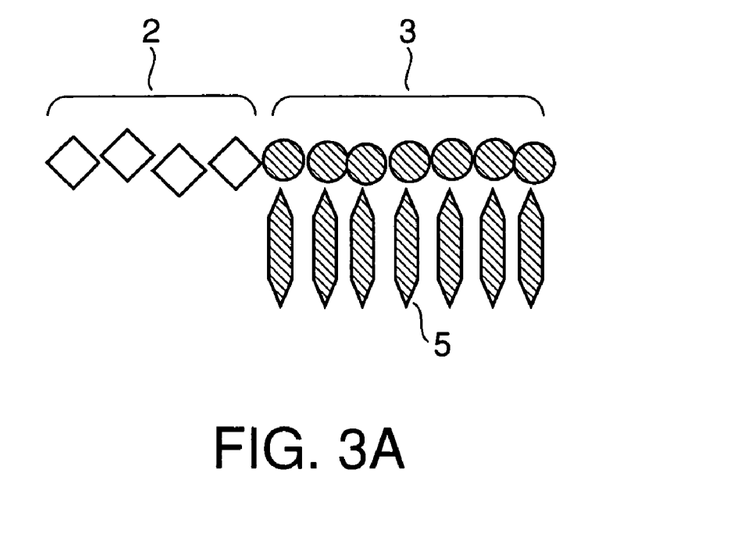
FIG. 3A is a schematic diagram showing a diblock copolymer comprising a block having a mesogen group.
Figure 3B:
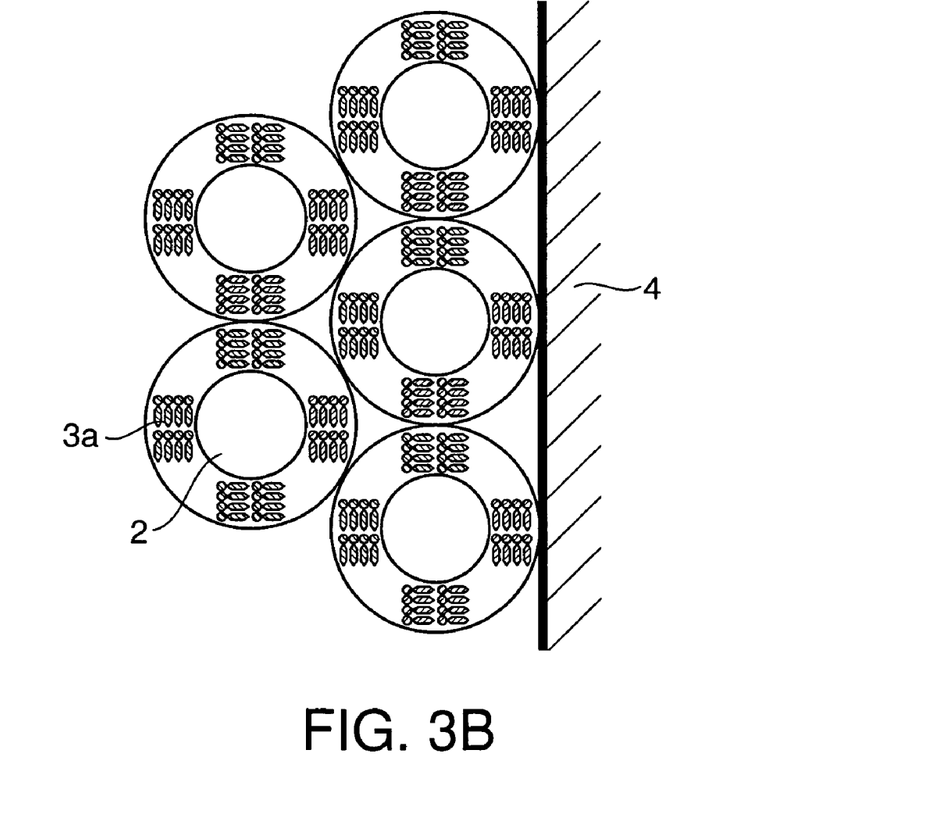
FIG. 3B is a schematic diagram showing an ordered array of the diblock copolymer in groove structure.

When the solution of the block copolymer is coated on the substrate on which the groove structure is formed, a plurality of block copolymer molecules gather together to form assembly. The assembly changes in size depending on a type of blocks forming the block copolymer and a type, temperature and the like of the solution used, and in general the diameter $A_0$ in terms of sphere or cylinder ranges from 1 nm to 100 nm, preferably 2 nm to 30 nm. The assemblies are regularly arrayed on the inner face of the groove as illustrated in FIG. 3.

Figure 1:
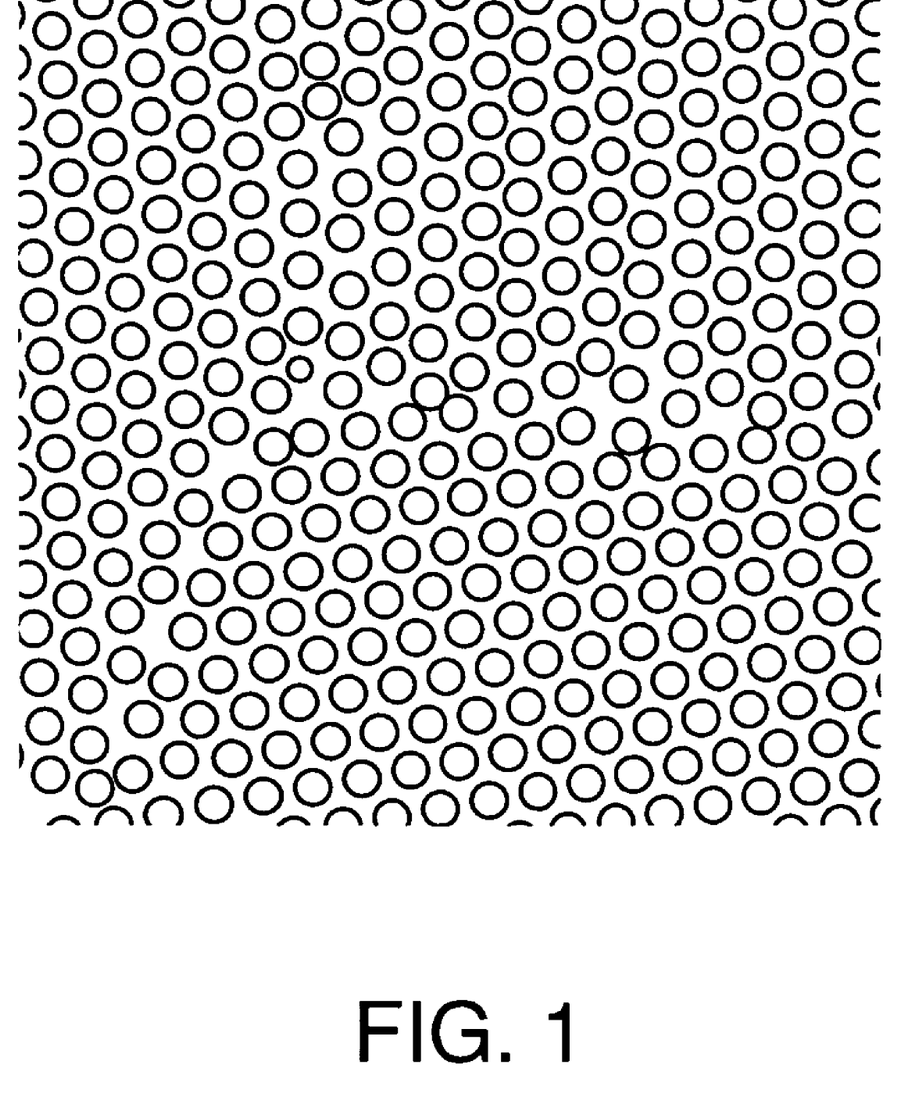
FIG. 1 is a schematic diagram showing polycrystalline structure shown by a typical block copolymer.
Figure 2A:
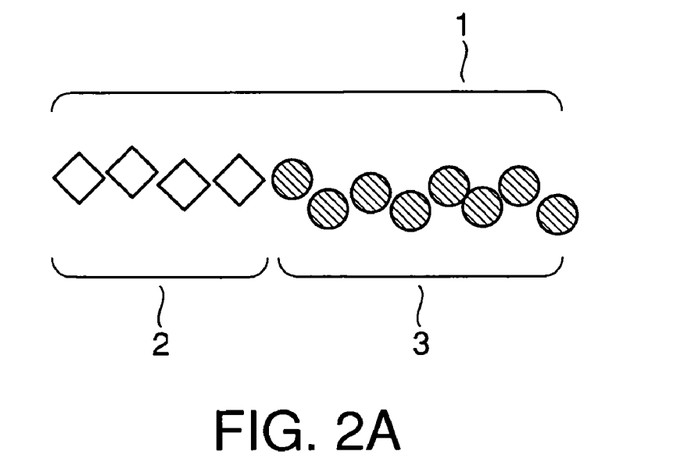
FIG. 2A is a schematic diagram showing a structure of a conventional diblock copolymer.
Figure 2B:
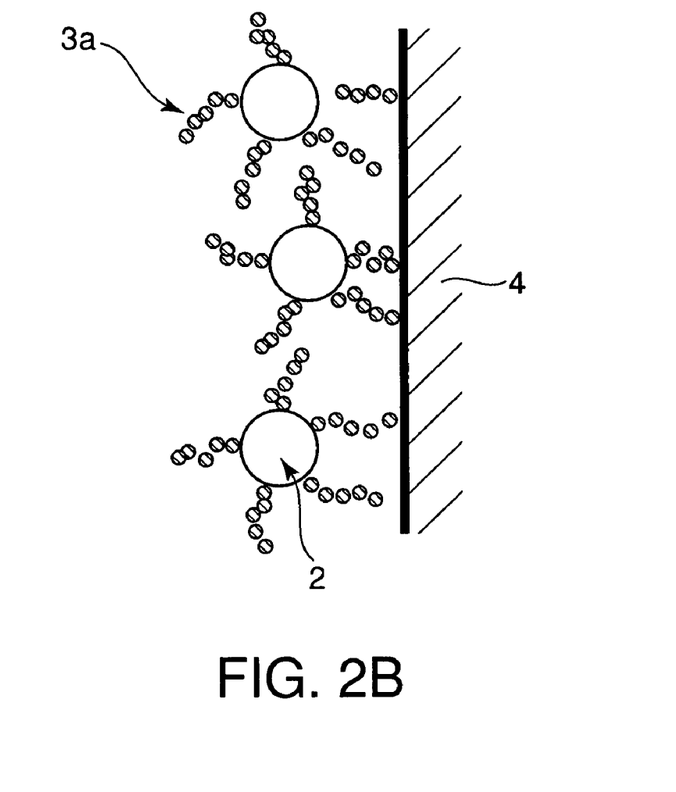
FIG. 2B is a schematic diagram showing an ordered array of the diblock copolymer in groove structure.

In the block copolymers comprising the mesogen groups, the mesogen groups align with each other because of the interaction, so that tight phase separation structure is formed. However, even in the type of block copolymer as described above, the alignment directions of the mesogen groups are random in each phase separation region, so that a large amount of distortion of molecular arrangements or a great disturbance in the regularity occurs in the solution or the like. For example, the phase separation structure of a conventional block copolymer is polycrystalline structure as shown in FIG. 1. In the method disclosed in, for example, Japanese Patent Laid-Open Publication No. 279616/2002, the phase separation structure of a block copolymer is structure as illustrated in FIGS. 2A and 2B. In FIGS. 2A and 2B, a conventional block copolymer (1') constituted of a block A (2') and a block B (3') has structure in which the copolymers gather together around the block A (2') and the block B (3') extends molecular chains (a random coil 3a' of the block B) toward the outside of the assembly. In other words, because of such structure that the polymer molecules are generally folded in random and the chains extend in the random directions, when the polymer molecules are arranged along a wall face (4) of a groove formed in the substrate, the period of ordered structure is less likely to become constant. According to the method of the present invention, however, when the block copolymer comprising the mesogen group exhibits phase separation in the groove structure, the mesogen groups (5) are in a certain orientation on the wall face (4) of the groove as illustrated in FIG. 3B. On this account, it is possible to align the orientations of the mesogen groups in each groove as a whole, and therefore, to achieve the ordered structure having highly precise arrays of assembly. The mesogen groups aligned on the wall face of the groove form layered structure having a stack of mesogen groups. Thus, positions of the ordered patterns from the wall face of the groove in the phase separation structure precisely align at a molecular level defined by the thickness of the mesogen group layer. In this manner, the distance between the wall face of the groove and the assembly is defined with high precise. Further, regarding the direction along the wall, because the mesogen groups form the ordered structure at the molecular level, the array periods of the assembly also precisely align at the molecular level in the direction along the groove.

To achieve arrays of the block copolymers mainly in the groove structure, the groove structure formed on the sample substrate is preferably in the conditions $D \geq A/2$ and $W \geq A$, where W is a groove width, D is a groove depth and A is an array period of block polymer assembly. More specifically, in the present invention, A is equal to or greater than the foregoing diameter $A_0$ of the block copolymer assembly, and ranges from 2 nm to 100 nm in general, more preferably 2 nm to 20 nm. The groove depth D and the groove width W are determined in accordance with the array period A. If these conditions are satisfied, when the substrate is coated with an appropriate amount of block copolymer, the phase separation structure is created only in the depressed portion of the groove. Regarding the groove structure as described above, for example, a Si substrate or glass substrate is coated with a resist and then fine groove patterns are formed by the use of photolithography, electron beams, X-rays or the like. Alternatively, such a resist pattern may be used as an etching mask in order for the groove patterns to be transferred to the Si substrate or glass substrate. Alternatively, the patterns may be transferred by a method using a nanoimprint technique for coating the Si substrate or glass substrate with a polymer film and then pressing a stamper with groove structure formed thereon against the Si or glass substrate at high pressure to transfer the groove structure to the polymer film. In this case, as the polymer film, for example, polystyrene, polymethyl methacrylate, polyimide, novolac resin, or a silicon-containing polymer such as HSQ, SOG (Spin On Glass) can be used.

Further, even groove structure in the condition $D<A/2$, where D is the groove depth and A is the array period of the block copolymer assembly, can be effectively used in some instances. In the case of such a condition, the positional precision of the ordered patterns by the groove wall deteriorates as compared with the case of using the groove structure in the conditions $D \geq A/2$ and $W \geq A$ as described earlier. However, in this case, the phase separation structure is formed on the convex portion of the groove, resulting in formation of ordered patterns in which the orientation is controlled across the whole surface of the sample. Regarding the method of forming the groove structure, a method using the lithography technique as described above may be used.

Next, a description is given of a method of using the block copolymer patterns created as described above to fabricate a structure on the substrate surface. In order to enhance the liquid crystalline properties, the block B of the diblock copolymer of the present invention often includes cycle structure of benzene ring or the like which corresponds to "P" in the foregoing general formula (I). Hence, the block B has high resistance to dry etching. More specifically, if the block A comprises a polymer chain having no benzene ring, such as polyethylene, polybutadiene, polyisoprene or polyethylene oxide, in the structure only the portions corresponding to the blocks B remain after the dry etching process. If the diblock copolymer pattern is formed on the substrate to be processed, it is possible to form array pattern of high ordering quality on the processed substrate.

For example, in the case of using a Si substrate as the substrate to be processed, the groove structure of resist is formed on the Si substrate by the use of photolithography or the like, then the Si substrate is coated with a diblock copolymer comprising a mesogen group, and then undergoes the annealing treatment or the like to allow self-assembly pattern formation. After that, an etching process using Reactive Ion Etching (RIE) and a fluorine series etching gas such as $CF_4$ is performed. As a result, first, in the film of diblock copolymer only the block A, namely, the block having no mesogen group, is removed. Then, the regions of the surface of the Si substrate which have hidden beneath the block A are etched, so that the ordered pattern is transferred. Further, another materials having high resistance to etching is deposited on the regions where the block A is selectively removed, and then an etch back process or the like is performed to fill the concave portions resulting from the removal of the block A, so that the substrate can be etched by the block A and the high-etching-resistant materials. The high-etching-resistant materials filling in the holes after the block A has been removed, include metal and semiconductor such as Ta, W, Ti, Ni, Si and oxide such as $SiO_2$, $Al_2O_3$, $TiO_2$ as examples. These materials are deposited by evaporation from above the relief pattern resulting from the selective removal of the block A, to form a film of a thickness making the surface adequately flat. After that, a method using RIE, ion beam sputtering, Chemical Mechanical Polishing (CMP) or the like is used to perform an etch back process for exposing the block B. After that, the block B can be removed by oxygen plasma etching, to form a mask pattern which is used when the substrate to be processed is etched. The high-etching-resistant mask pattern thus formed is used to etch the substrate subject to the process, thereby making it possible to fabricate the substrate with high accuracy and with a high aspect ratio.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

The embodiment of the present invention will be described below in further detail with reference to the examples, but the present invention is not intended to be limited to these examples.

Example 1

In Example 1, groove structure is formed by the use of photolithography. A diblock copolymer used as the block copolymer having the mesogen group has 30% by weight of a polyethylene oxide block A and 70% by weight of a block B expressed by the following formula. First, L/S having a groove width W of 300 nm, a groove depth D of 20 nm and a pitch of 500 nm is formed on a resist film of a film thickness of 20 nm by photolithography, which is then spin-coated with a toluene solution of the aforementioned diblock copolymer. Dyeing is performed to facilitate observation of the phase separation structure.

Figure 5:
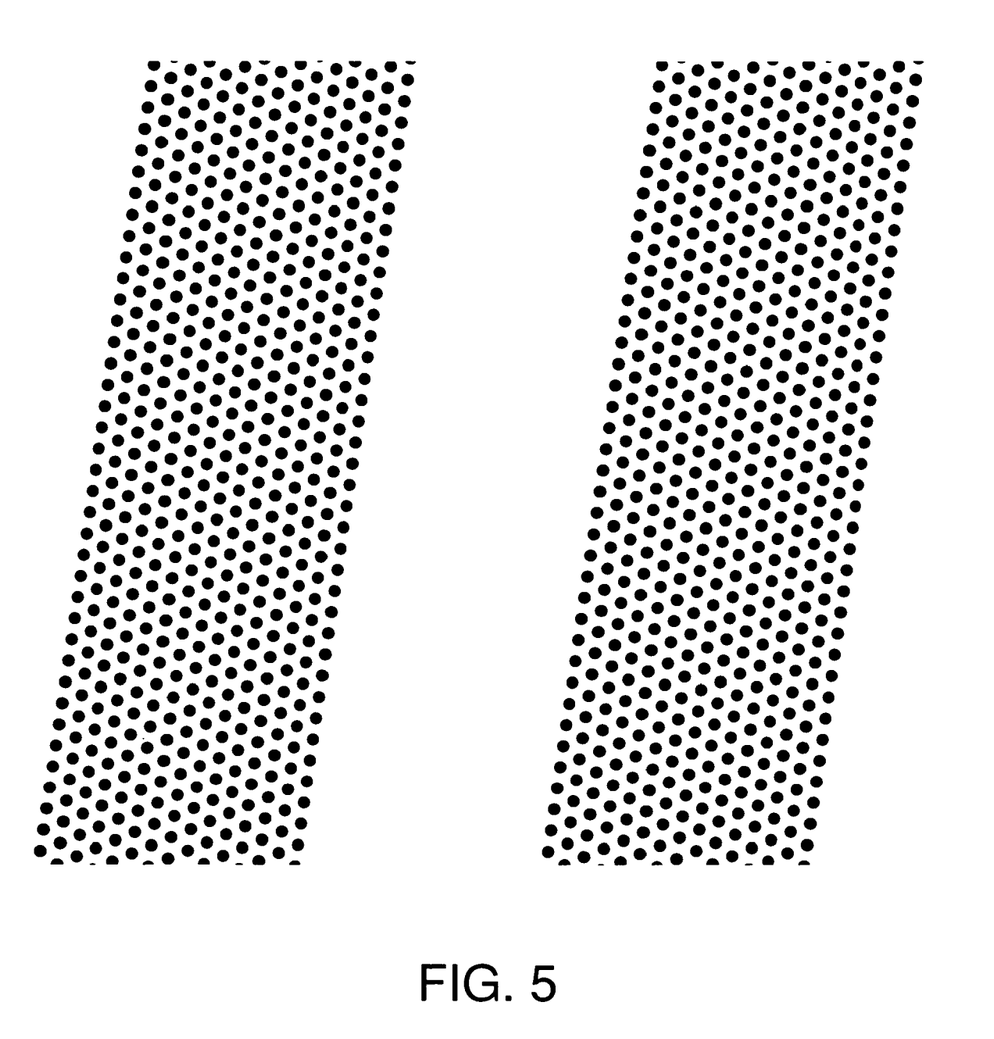
FIG. 5 is a diagram showing a TEM image of ordered pattern provided in Example 1.
Figure 6A:
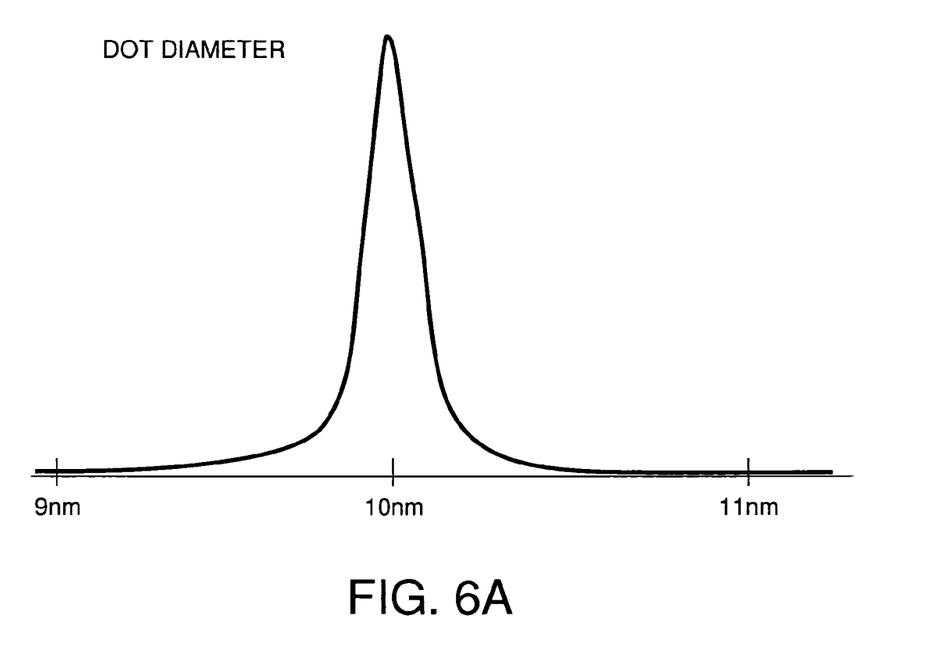
FIGS. 6A and 6B are distribution charts of a dot diameter and an array period of ordered structure provided in Example 1.
Figure 6B:
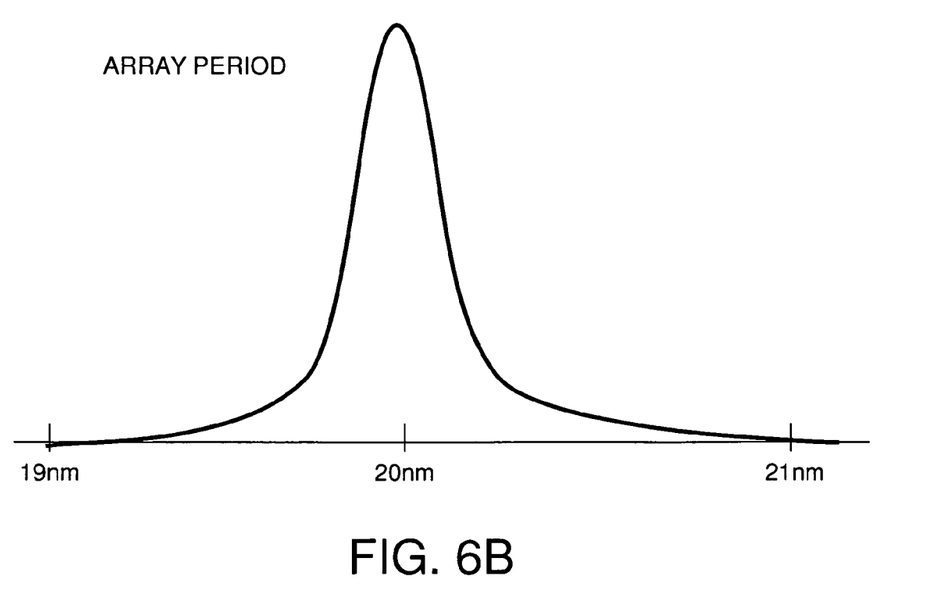

FIG. 5 shows a TEM image of the patter thus created. FIGS. 6A and 6b show variations in the dot diameters and the array periods A.

Comparison Example 1

Figure 7A:
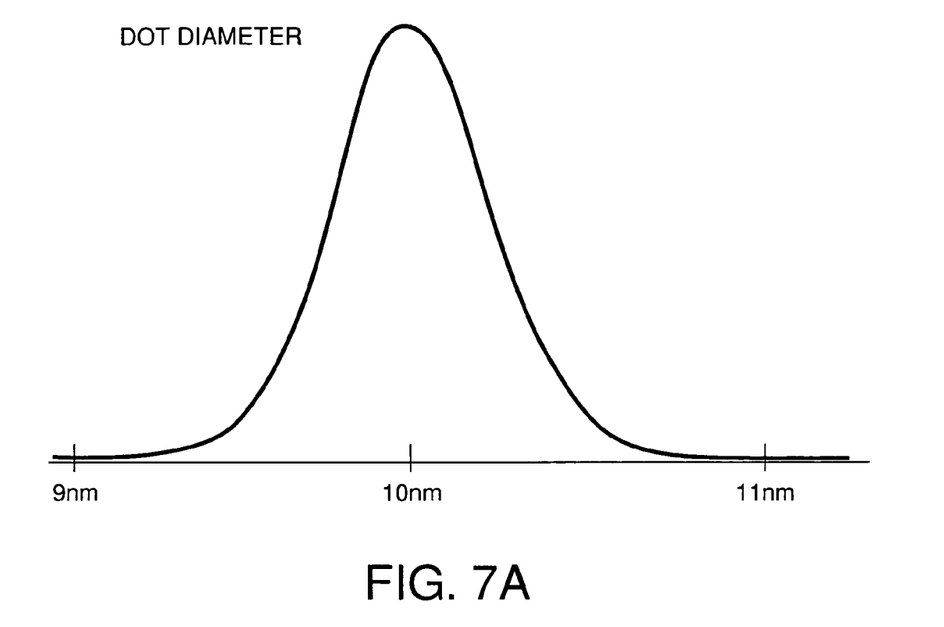
FIGS. 7A and 7B are distribution charts of a dot diameter and an array period of ordered structure provided in Comparison Example 1.
Figure 7B:
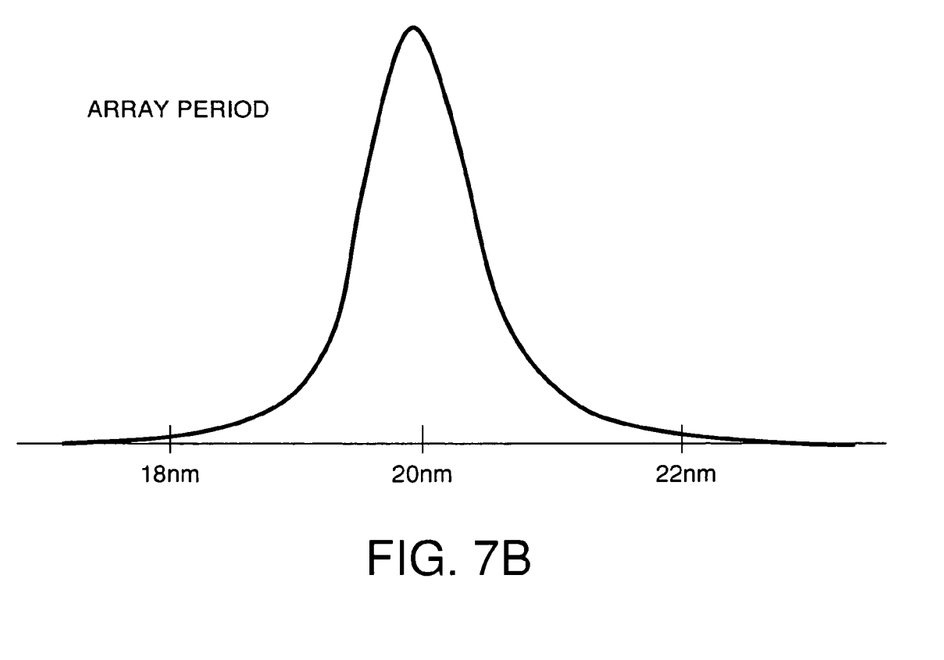

Comparison Example 1 uses the same block copolymer as that in Example 1, and initiates phase separation on the flat surface without the groove structure formed thereon for comparison. FIGS. 7A and 7B show variations in the dot diameters and the array periods. The variations in the dots are evaluated from the half width at half maximum of the distribution, resulting in about 3% of the average dot diameter. The variations in both the dot diameters and the array periods in Example 1 are about 1%. Therefore, it has been shown that the ordering quality of the ordered pattern is improved in Example 1.

Comparison Example 2

Figure 8:
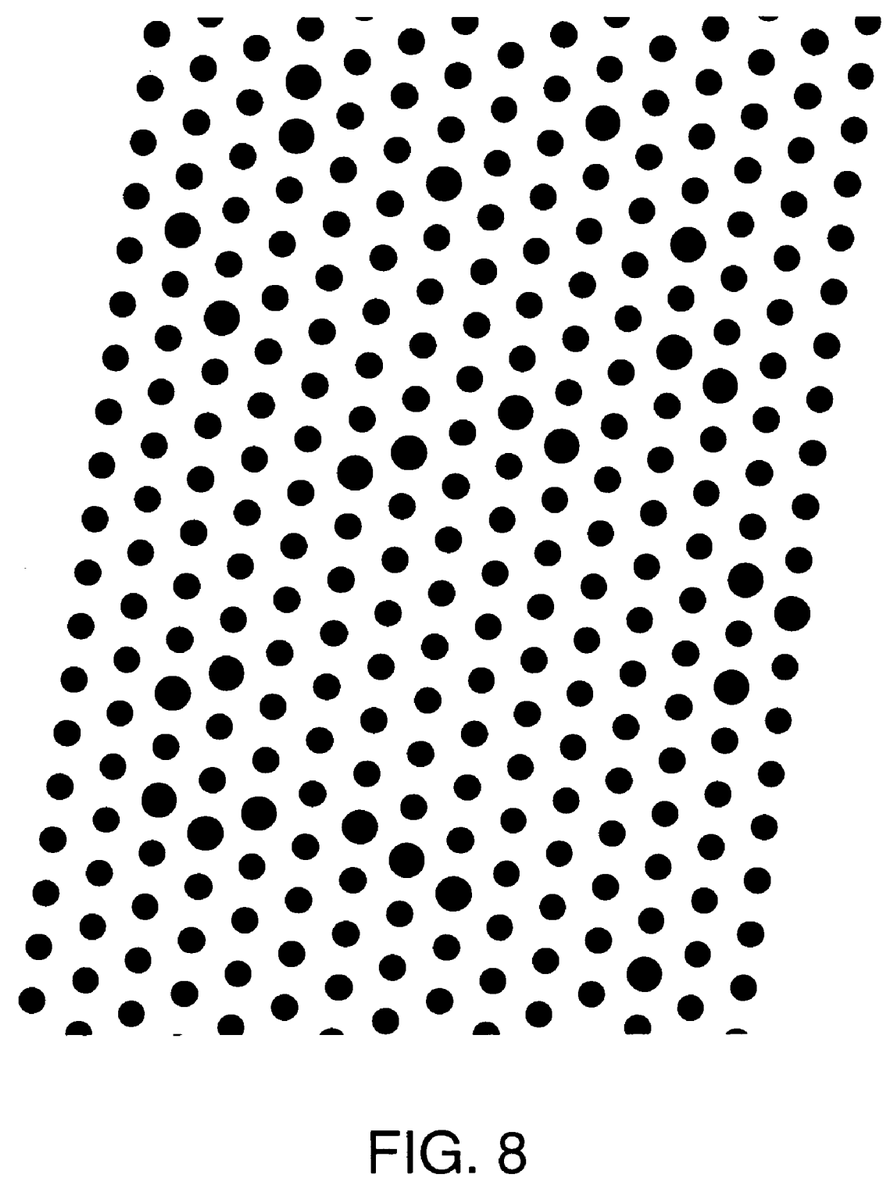
FIG. 8 is a diagram showing an AFM image of ordered pattern provided in Comparison Example 2.
Figure 9A:
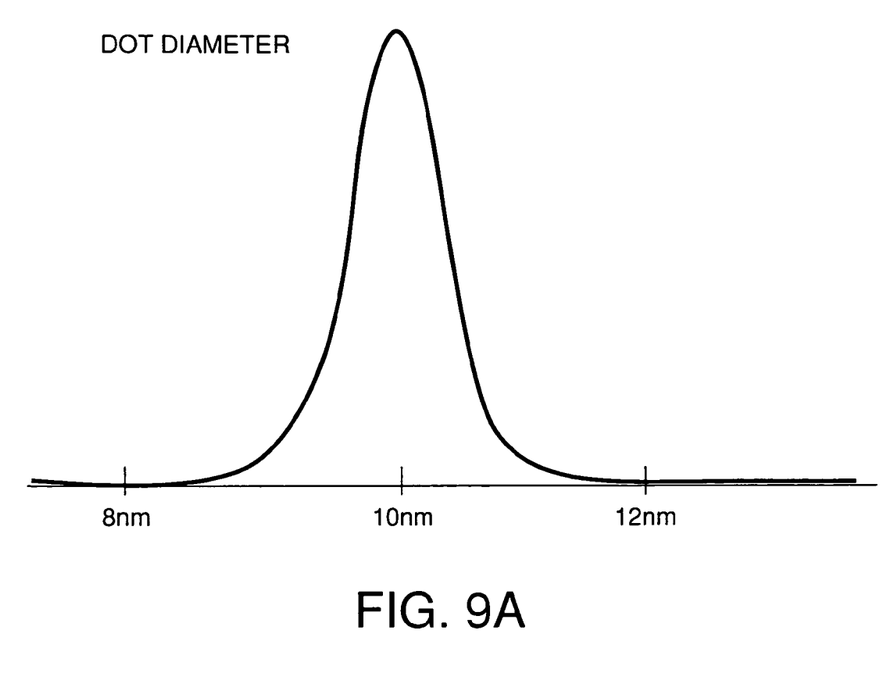
FIGS. 9A and 9B are distribution charts of a dot diameter and an array period of ordered structure provided in Comparison Example 2.
Figure 9B:
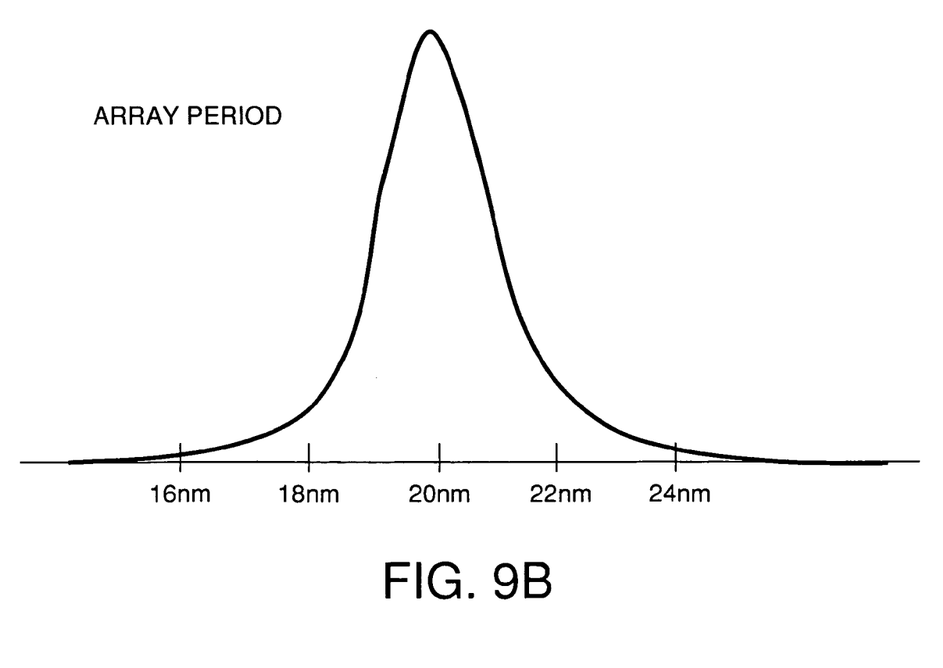

In Comparison Example 2, a diblock copolymer used as the block copolymer has a block A1 including PMMA and a block A2 including polystyrene. The total molecular weight is 40000. A weight ratio of the block A1 is 30%, and a weight ratio of the block A2 is 70%. Groove structure is created as in the case of Example 1. To facilitate observation of the phase separation structure, after ultraviolet radiation is applied to the PMMA portion, the sample is rinsed for removal of it. FIG. 8 shows an AFM image of the pattern thus formed. FIGS. 9A and 9B show variations in the dot diameters and the array periods. The variations in the dots diameters and the array periods are about 5% in Comparison Example 2. Therefore, it has been also shown that the ordering quality of the ordered pattern is improved in Example 1.

Example 2

In Example 2 the case where groove structure is formed by the use of nanoimprint lithography is described. A Ni stamper having line pattern projected in a groove width of 300 nm, a pitch of 500 nm, and a groove depth of 20 nm is fabricated to be used for a novolac resist coated at a film thickness of 50 nm. For fabricating the stamper, the line pattern is written on an electron beam resist on a Si wafer by an electron beam technique. Then, the pattern is transferred at a depth of 20 nm to the Si wafer by RIE using $CF_4$ as an etching gas, and then the remaining resist is removed. After that, Ni spattering is performed on the surface to make it conductive, and then Ni is deposited on the plating. The stamper thus fabricated is pressed against a novolac resist on the sample substrate to transfer the pattern of the stamper to the resist film. When transferring the pattern, the sample is retained at a temperature of 120° C. After the stamper is pressed for about one minute, the sample substrate is cooled to a temperature of 80° C. or lower. Then, the stamper and the sample substrate are detached from each other. After the pattern is formed, the novolac resist is hardened by far-ultraviolet radiation. Then, a coating of the same diblock copolymer as that used in Example 1 is applied. The phase separation structure is verified by TEM, and the variations in the dot diameters and the array periods are evaluated from the half width at half maximum of the distribution. As a result, the variations are about 1% of the average dot diameter, and the pattern thus formed has a high ordering quality.

Example 3

In Example 3 the case where the groove depth D of the groove structure is set at D<A/2 with respect to the array period A of the block copolymer is described. The groove structure is formed by a method using the nanoimprint technique. Regarding the stamper, a Ni stamper having a groove width of 300 nm, a pitch of 500 nm, and a groove depth of 3 nm is fabricated for use. The Ni stamper is fabricated by the same method as that in Example 2. The Ni stamper is pressed against a 20-nm-thick novolac resist film on the sample substrate to transfer the pattern of the stamper to the resist film. At this point, the sample is retained at a temperature of 120° C.

After the temperature of the sample substrate is decreased to 80° C. or lower, the stamper and the sample substrate are detached from each other. Then, the novolac resin is hardened by far-ultraviolet radiation. Then, a coating of the same diblock copolymer as that used in Example 1 is applied. The phase separation structure is verified by TEM. As a result, the following is recognized: ordered arrays are formed on the entire face along the direction of the groove structure, the variations in the dot array periods are about 2%, and the ordered arrays are formed with high precision.

Example 4

In Example 4, an example of using the ordered pattern, fabricated by Example 2, as a template to manufacture patterned media of a magnetic substance is described.

First, a thin film of a CoCrPt alloy is formed on a 5-nm-thick glass substrate by a sputter deposition technique, and ordered pattern is formed on the thin film by the same process as that done in Example 2. Next, RIE is performed on the sample by the use of an oxygen gas to remove a part of the block A of polyethylene oxide. Then, on the surface after the block A has been partially removed, Ta is deposited to a film thickness of 200 nm by the sputter deposition technique. Then, the Ta film is etched back by RIE using a $CF_4$ gas to expose the block B, so that Ta-island structure of 10 nm diameter is formed. Next, RIE using an oxygen gas is performed to remove a part of the block B. Then, the CoCrPt film is etched by argon ion milling to transfer the pattern. The shape after the etching has been performed by TEM and EDX is observed. As a result, the patterning of CoCrPt dots, and the complete removal of CoCrPt from the sea region by the etching are verified. Further, the distribution of the array periods of CoCrOt dots is verified on the TEM image. As a result it is recognized that the half width at half maximum is 2% or less of the average dot diameter

The invention claimed is:

1. A pattern forming method using a phase separation structure of a block copolymer, comprising:
coating a substrate including a groove structure pre-formed thereon, with a solution of the block copolymer comprising at least one block comprising a mesogen group represented by the following formula (I):

(I)

wherein,
P is a divalent group selected from the group consisting of:

Y, if present, is selected from the group consisting of —F, —Cl, —Br, —$CH_3$, —$(CH_2)_n$—$CH_3$, —$OCH_3$, —OH, —CN and —$NO_2$, X is a binding group which is selected from the group consisting of a single bond, —COO—, —$OCH_2$—, —CH=N—, —C≡C—, —O—, $CH_2$—, —COS—, —CON— and —N=N—, m is a numerical value equal to or greater than zero, and n is a numerical value equal to or greater than 2, said mesogen group providing an intermolecular force suitable for crystallinity; and causing the block copolymer to self-assemble in the groove structure, thereby forming block copolymer assemblies in such a way as to be regularly arrayed.

2. The pattern forming method according to claim 1, wherein the groove structure is pre-formed so that D≧A/2, and W≧A, where W is a groove width, D is a groove depth and A is an array period of the block copolymer assemblies.

3. The pattern forming method according to claim 1, wherein the groove structure is pre-formed so that D<A/2, where D is a groove depth and A is an array period of the block copolymer assemblies.

4. The pattern forming method according to claim 1, wherein a weight-average molecular weight of the block copolymer ranges from 10,000 to 200,000, and a ratio weight of the block comprising the mesogen group to the block copolymer ranges from 50% to 98%.

5. The pattern forming method according to claim 1, wherein an array period A of the block copolymer assemblies ranges from 2 nm to 100 nm.

6. A pattern forming method according to claim 1, further comprising:
annealing the substrate after the step of coating the substrate with the solution of the block copolymer.

7. The pattern forming method according to claim 6, wherein the annealing is performed in a range from 60° C. to 300° C.

8. A processing method, comprising:
a first process of forming a pattern by providing on a substrate including a groove structure pre-formed thereon a block copolymer comprising at least one block comprising a mesogen group represented by the following formula (I):

(I)

wherein,
P is a divalent group selected from the group consisting of:

Y, if present, is selected from the group consisting of —F, —Cl, —Br, —CH$_3$, —(CH$_2$)$_n$—CH$_3$, —OCH$_3$, —OH, —CN and —NO$_2$, X is a binding group which is selected from the group consisting of a single bond, —COO—, —OCH$_2$—, —CH=N—, —C≡C—, —O—, CH$_2$—, —COS—, —CON— and —N=N—, m is a numerical value equal to or greater than zero, and n is a numerical value equal to or greater than 2, said mesogen group providing an intermolecular force suitable for crystallinity, causing the block copolymer to self-assemble in the groove structure, and thereby forming block copolymer assemblies in such a way as to be regularly arrayed; and a second process of using the formed pattern as a template to process a substrate as a work piece.

9. The processing method according to claim 8, wherein the formed pattern is used as the template to perform a dry etching treatment for removing a part of a block which does not comprise a mesogen group, thereby to process the substrate.

10. A method for forming block copolymer assemblies, comprising;
preparing a substrate having a groove thereon;
coating the substrate with a block copolymer solution comprising at least one block comprising a mesogen group represented by the following formula (I):

wherein,
P is a divalent group selected from the group consisting of:

Y, if present, is selected from the group consisting of —F, —Cl, —Br, —CH$_3$, —(CH$_2$)$_n$—CH$_3$, —OCH$_3$, —OH, —CN and —NO$_2$, X is a binding group which is selected from the group consisting of a single bond, —COO—, —OCH$_2$—, —CH=N—, —C≡C—, —O—, CH$_2$—, —COS—, —CON— and —N=N—, m is a numerical value equal to or greater than zero, and n is a numerical value equal to or greater than 2.

said mesogen group providing an intermolecular force suitable for crystallinity; and causing the block copolymer to self-assemble in the groove, thereby forming block copolymer assemblies which are regularly arrayed.

11. The method according to claim 10, wherein a weight-average molecular weight of the block copolymer ranges from 10,000 to 200,000; and a ratio weight of the block comprising the mesogen group to the block copolymer ranges from 50% to 98%.

12. The method according to claim 10, wherein an array period A of the block copolymer assemblies ranges from 2 nm to 100 nm.

13. The method according to claim 10, further comprising:
annealing the substrate after the step of coating the substrate with the solution of the block copolymer.

14. The method according to claim 13, wherein the annealing is performed in a range from 60° C. to 300° C.

* * * * *